(12) United States Patent
Hindman (10) Patent No.: US 6,324,592 B1
(45) Date of Patent: Nov. 27, 2001

(54) APPARATUS AND METHOD FOR A MOBILE COMPUTER ARCHITECTURE AND INPUT/OUTPUT MANAGEMENT SYSTEM

(75) Inventor: George W. Hindman, Austin, TX (US)

(73) Assignee: Keystone Aerospace, Austin, TX (US)

( * ) Notice: Subject to any disclaimer, the term of this patent is extended or adjusted under 35 U.S.C. 154(b) by 0 days.

(21) Appl. No.: 09/028,590

(22) Filed: Feb. 24, 1998

Related U.S. Application Data
(60) Provisional application No. 60/038,078, filed on Feb. 25, 1997.

(51) Int. Cl.⁷ .............................. G06F 3/00; G06F 13/12; G01C 21/00; G06G 7/78
(52) U.S. Cl. .................................. 710/3; 710/2; 710/64; 701/207; 701/220
(58) Field of Search .................... 710/2, 3, 5, 62, 710/64; 701/29, 207, 211, 216, 217, 220

(56) References Cited

U.S. PATENT DOCUMENTS

| | | |
|---|---|---|
| 4,232,313 | 11/1980 | Fleishman . |
| 4,731,613 | 3/1988 | Endo et al. . |
| 4,751,512 | 6/1988 | Longaker . |
| 4,758,959 | 7/1988 | Thoone et al. . |
| 4,796,191 | 1/1989 | Honey et al. . |
| 4,937,753 | 6/1990 | Yamada . |
| 5,046,011 | 9/1991 | Kakihara et al. . |
| 5,119,102 | 6/1992 | Barnard . |
| 5,276,451 | 1/1994 | Odagawa . |
| 5,334,986 | 8/1994 | Fernhout . |
| 5,337,243 | 8/1994 | Shibata et al. . |
| 5,359,521 | 10/1994 | Kyrtsos et al. . |
| 5,627,547 | * 5/1997 | Ramaswamy et al. ......... 342/357.08 |
| 5,724,316 | * 3/1998 | Brunts ..................................... 368/10 |
| 5,774,828 | * 6/1998 | Brunts et al. ........................ 701/210 |
| 5,777,580 | * 7/1998 | Janky et al. .......................... 342/457 |
| 5,787,259 | * 7/1998 | Haroun et al. ....................... 709/253 |
| 5,794,164 | * 8/1998 | Beckert et al. ...................... 455/456 |
| 5,828,899 | * 10/1998 | Richard et al. .......................... 710/8 |
| 5,887,269 | * 3/1999 | Brunts et al. ........................ 701/208 |
| 5,915,001 | * 6/1999 | Uppaluru ........................... 379/88.22 |
| 5,950,161 | * 9/1999 | Kozuma et al. ..................... 704/260 |

\* cited by examiner

Primary Examiner—Thomas Lee
Assistant Examiner—Chun Cao
(74) Attorney, Agent, or Firm—Lila B. Glaser (57) ABSTRACT

The present invention provides a system, apparatus, and method for a robust and configurable computer architecture which combines standard Amplitude Modulation (AM)/Frequency Modulation (FM) radio and Compact Disk Read Only Memory (CDROM) features with mobile computational capabilities. The present invention further provides a unique bus network which allows for an efficient and durable Input/Output (I/O) management system. The I/O management system has configurable data bus and discrete line connections to allow for modular addition, expansion, or replacement of navigation, crash detection, and communication line replacement units (LRUs). Additional I/O device connections allow several modes of input into the computational system. The present invention is a single, self-contained enclosure which easily installs into most existing vehicles with minimum time and effort. Furthermore the present invention provides an accessible user interface for the computer system and possesses several theft protection features.

15 Claims, 8 Drawing Sheets

APPARATUS AND METHOD FOR A MOBILE COMPUTER ARCHITECTURE AND INPUT/OUTPUT MANAGEMENT SYSTEM

This application claims the benefit under U.S.C. § 119 (e) of U.S. provisional application No. 60/038,078 filed on Feb. 25, 1997. This application claims the benefit of U.S. PTO Document Disclosure number 378,234 dated May 15, 1995.

BACKGROUND OF INVENTION

1. Field of Invention

The present invention introduces a new, flexible mobile computer architecture and therefore relates to several different fields. These fields include navigation, communications (including radio navigation), electrical computers, computer architectures, Input/Output (I/O) management, data processing systems, data storage and retrieval, land vehicles, motor vehicles, and radio frequency reception and use.

2. Description of the Related Art

Current mobile computer architectures have fixed configurations which limit their capabilities. These computer systems are designed to interface with predetermined input/out devices and offer little flexibility for easy field installation and removal. Examples of equipment used in fixed configurations include hardwired 900 MHz radio receivers and transmitters and navigation aids such as geomagnetic sensors, angular rate sensors, odometer connections and radio navigation interfaces.

It is usually desired in field operations to use hardware components designated as line replacement units (LRUs). These LRUs promote flexibility and possess easy reconfiguration capabilities in mobile vehicle environments. LRUs accomplish these features by having standardized Input Output (I/O) interfaces. The present invention provides for a unique mobile computer architecture facilitating the use of LRUs.

Input/Output (I/O) devices are currently connected to computing platforms in numerous ways. One method of coupling I/O devices to a computer system is to allow the computer system, which is processing software, to direct input/output instructions over a bus to read/write registers located on the input/output device. Examples of this are the Industry Standard Architecture (ISA) bus, the Extended Industry Standard Architecture (EISA) bus, and the Peripheral Component Interconnect (PCI) bus. Another method couples a computer system with I/O devices by not directly sending input/output instructions to registers on the I/O device. Examples of such a set-up are the VME Extensions for Instrumentation (VXI) bus and the General Purpose Interface Bus (GPIB). The present invention is a configurable architecture allowing for direct and indirect means of I/O management as well as the use of I/O discrete lines. Such an I/O management system does not exist in the prior art and would be beneficial for mobile user operations.

Additionally, current mobile computer systems do not provide line replaceable units for purposes such as navigation and telecommunications. These existing systems also do not possess standard radio features such as a stereo Amplitude Modulation (AM)/Frequency Modulation (FM) and Compact Disk Read Only Memory (CDROM) audio capabilities. Examples of these limited mobile platforms are units which provide only navigation aid, or only navigation and guidance aid, or only mobile communications. The present invention provides these features as well as additional ones not found in any current apparatus. An example is that no current unit provides for the additional use of a microprocessor to augment the application capabilities available to the mobile user. These capabilities include, but are not limited to, data acquisition, data analysis, non-navigation data storage and retrieval, and basic data base access. The present invention provides for the additional use of a microprocessor to augment the capabilities available to the mobile user.

The physical appearance of the present invention is designed to allow for the easy replacement of the unit's faceplate. By incorporating a standardized user interface, customized faceplate designs can be readily installed. Additionally, current theft protection measures for mobile computing platforms usually rely on non-configurable emergency notification schemes; theft deterrence features for systems are limited. The present invention provides innovative theft protection features so that the unit is not easily used if stolen. The computer system architecture also allows for theft protection of deployed hand held user interfaces. User safety is also promoted by the hand unit storage capability for when the vehicle is in motion.

An additional safety consideration involves emergency accident notification. The prior art involving this capability involves the use of acceleration data to determine if the vehicle has been involved in an accident. When an accident is detected, by means of sudden deceleration, a radio transmission is sent to provide for emergency services. The current methods used to provide this crash detection notification rely on the use of physical and electrical connections to existing air bag sensors in vehicles. The present invention employs a different approach, incorporating the mobile computer's architecture and I/O management system with a emergency crash services LRU I/O device optimized for detecting and verifying accident related decelerations.

Another feature of the present invention involves navigation data presented to the mobile user. The existing prior art concerning the combination of navigation and computing capabilities can be broken into several major categories. The first grouping is of systems which provide direct microprocessor control of non-removable navigation and guidance components. These systems are sometimes comprised of radio navigation units, such as those used to receive U.S. Global Positioning System (GPS) or Russian GLONASS radio signals. Other approaches have an apparatus hardwired to receive orientation and velocity data from outside sensors, such as geomagnetic references, angular rate sensors, vehicle odometer connections, and/or inertial measurement systems.

A second approach taken in the existing art is to match data from stored precision map databases with data acquired from any of the above mentioned sensors. These approaches try to determine and present the vehicle's position as what is the "most probable" position on an existing road map. A third approach uses multiple antennae and receivers to eliminate possible errors. Still yet another approach is to use differential radio corrections transmitted to the vehicle navigation system within a certain geographical region. In addition to the selected method, all attempt to use some form of Kalman filtering to further improve the calculated location.

The above mentioned approaches employ systems and methods which are costly, require large amounts of physical space and electrical power, and require custom vehicle installation. To reduce cost and complexity and to provide a system that can physically fit in restricted spaces, a configuration must be established which attempts to reduce outside sensors and radio reception. Therefore, the present invention provides an improved system and method for location determination that enables a navigation LRU I/O device to receive radio navigation signals without using any additional outside mechanical sensors. This is accomplished by incorporating the mobile computer's architecture and I/O management system with an onboard sequence of statistical estimation calculations to improve location determination.

Lastly, the few existing mobile computer systems are usually housed in several enclosures and require custom installation in vehicles. The present invention provides for a unique computer architecture combining radio, CDROM, and microprocessor capabilities with a flexible I/O management system that is encased in a single modular unit. This promotes quick and easy installation in any vehicle.

SUMMARY OF THE INVENTION

The present invention embodies an apparatus, system, and method for combining a flexible input/output management system with a new mobile computer architecture. The disclosed mobile computer architecture possesses a microprocessor and standard radio features including stereo Amplitude Modulation (AM)/Frequency Modulation (FM) and Compact Disk Read Only Memory (CDROM) audio capabilities. The present invention further provides a specifically designed and optimized I/O management system for line replacement units (LRUs). This I/O management system allows for modular expansion and system upgrades.

The LRU devices cover user desired functions such as, but not limited to, navigation, crash detection, and telecommunications. Embodiments of such LRUs include a unique navigation I/O device with new statistical estimation capabilities and a crash detection I/O device with onboard deceleration calculation and verification features. The present invention is also encased in one modular unit. Additionally, theft deterrence features have been incorporated into the present invention.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Mobile Computer Architecture

Figure 1:
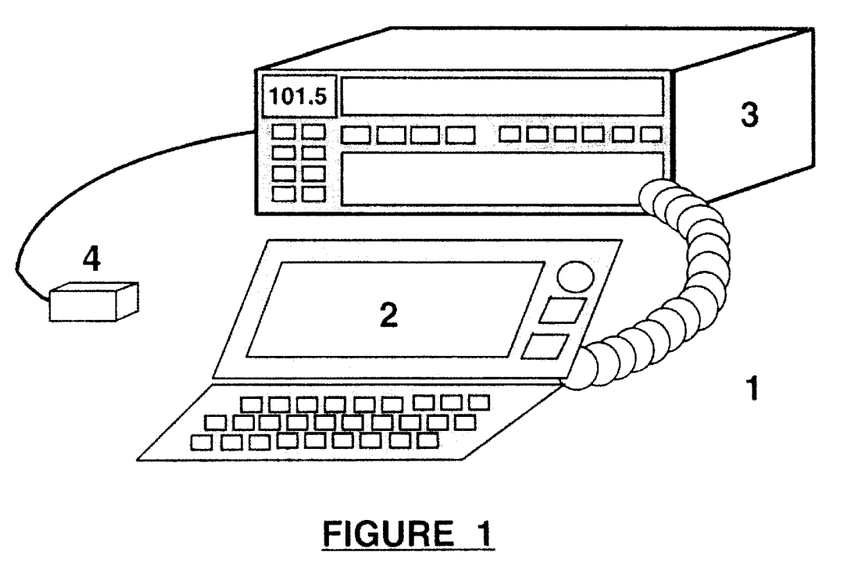
FIG. 1 illustrates the apparatus' appearance according to the present invention.

Referring now to FIG. 1, an illustration of the apparatus' appearance, the preferred embodiment of the present invention 1 is depicted as a single self contained unit which allows for easy installation into any existing or future land or motor vehicle. The hand held user interface unit 2 is stored in the main assembly 3. The navigation antenna 4 is shown coming from the rear of the main assembly 3, where other antennas, bus connections, I/O discretes, power connections, and auxiliary outlets originate.

Figure 2:
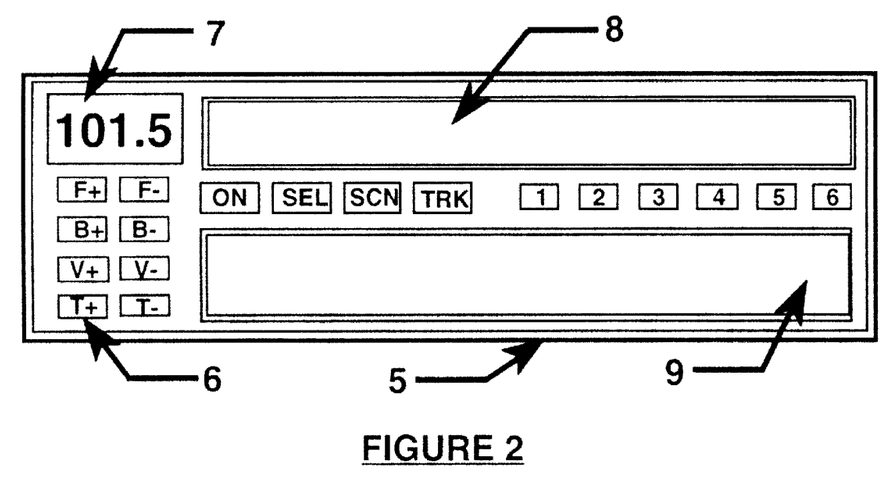
FIG. 2 illustrates the faceplate of the apparatus' main assembly.

Referring now to FIG. 2, an illustration of the faceplate of the apparatus' main assembly, the present invention's 1 main assembly faceplate 5 is shown with several component features. Function selection controls 6 are located on the faceplate to facilitate user interface with the present invention's AM/FM stereo radio and CD-ROM player. Function selection controls 6 are also available for other additional uses. Basic radio and CD-ROM output information is presented to the user via the Liquid Crystal Display (LCD) 7. Access to the CD-ROM is achieved through the CD-ROM tray access 8 and access to the hand held user interface unit 2 is available via the user interface storage slot 9.

Figure 3:
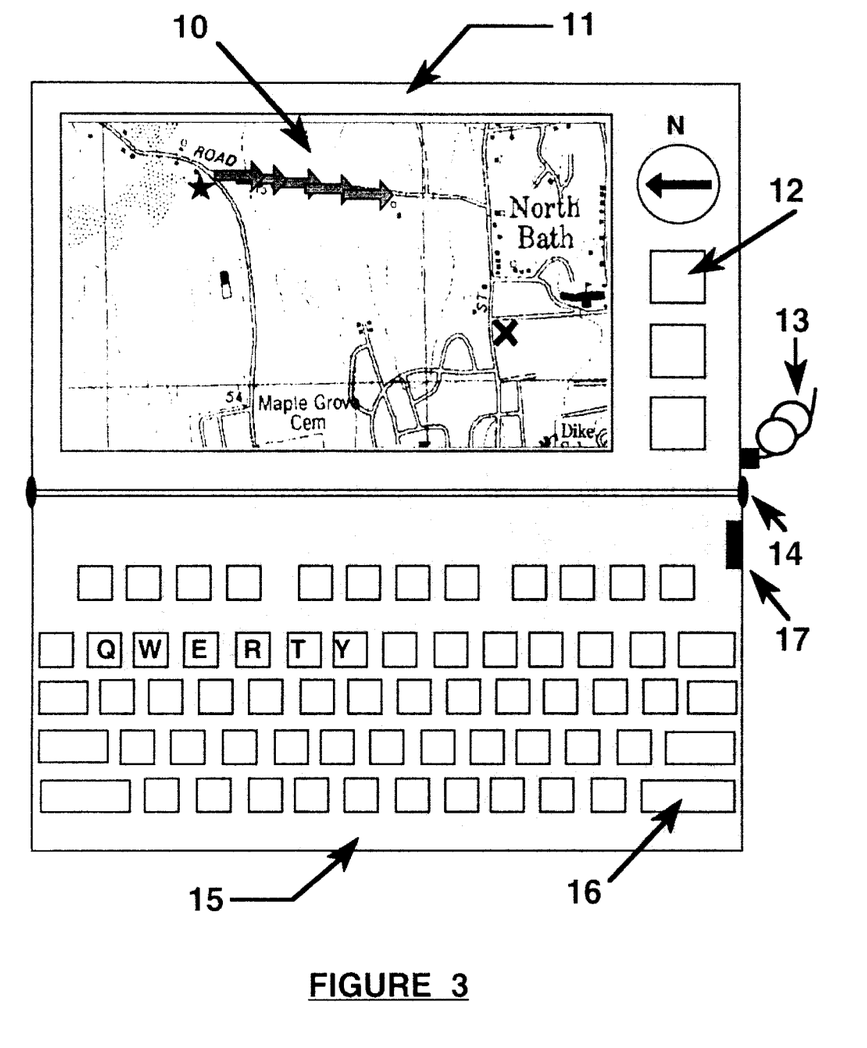
FIG. 3 illustrates the apparatus' hand held user interface.

Referring now to FIG. 3, an illustration of the apparatus' hand held user interface, the hand held user interface unit 2 is shown in an open position. The hand held interface unit upper casing 11 and the hand held interface unit lower casing 15 can be closed together by motion about the swivel mount 14. By securing the hand held interface unit 2 in a closed position, it is possible to then store the unit in the user interface storage slot 9 within the main assembly 3. Interface unit user selection controls 12, located on the unit casing, allow the mobile user to communicate with the computer system located within the main assembly 3. Information output from the computer system is displayed on the hand unit's display screen 10, which could be, but is not limited to, a touch sensitive LCD or active matrix thin film transistor (TFT) display.

Referring again to FIG. 3, the hand held user interface unit 2 has additional user input capabilities from either a keyboard entry system 16 or a voice command microphone system 17. The keyboard input can include, but is not limited to, standard alphanumeric keys found on a QWERTY style computer keyboard, function keys, HEX numeric keys, and mouse cursor and data entry techniques. The voice input can provide, but is not limited to, a microphone and the associated equipment needed for speech recognition. Data exchange between the hand held unit 2 and the mobile computer system housed within the main assembly 3, as well as the power supply, is provided through the power and data chord 13. Data exchange is not limited to this method as alternative embodiments could employ other means such as an Infra Red data port. Similarly, power could be provided by rechargeable or non-rechargeable battery systems.

Figure 4:
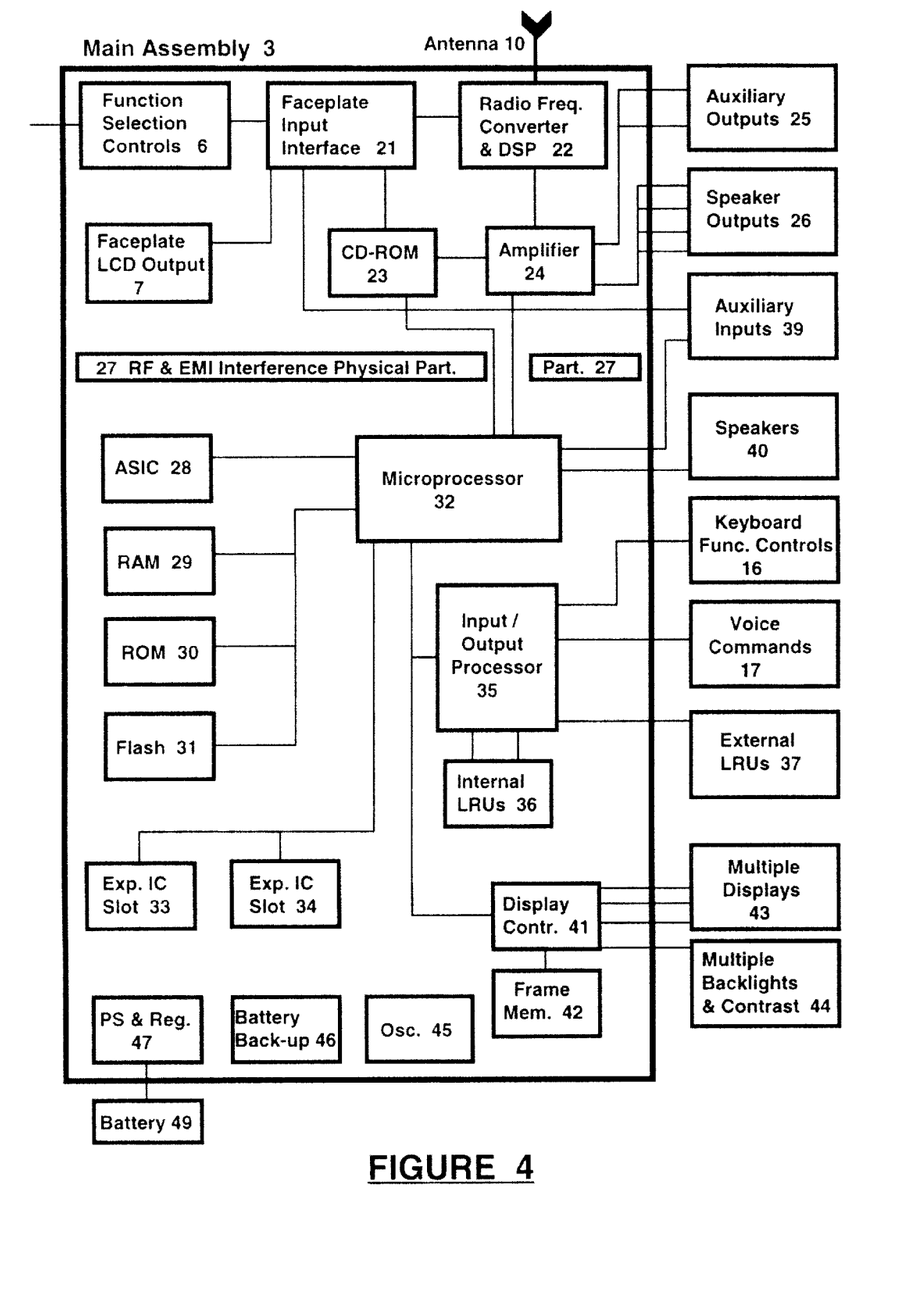
FIG. 4 is a block diagram illustrating the mobile computer architecture system.

Referring now to FIG. 4, a block diagram illustrating the mobile computer architecture of the present invention, it can be seen that the mobile computer architecture is enclosed within the main assembly 3. The mobile user is able to access the function selection controls 6, located on the main assembly faceplate 5, to input data to the radio and CD-ROM components of the mobile architecture. This input is read by the faceplate input interface 21, and distributed to the appropriate system component over the faceplate data bus network 48. Data output to the user is sent from the faceplate interface 21 over the bus network 48 to the faceplate LCD 7.

Referring again to FIG. 4, the AM/FM stereo radio component of the architecture receives its radio frequency (RF) signals from the radio antenna 20. These signals are sent to the RF filter and down converter digital signal processor (DSP) 22 which processes the radio signals so that conditioned signals can be sent to the amplifier 24. The amplifier 24 then sends the strengthened signals to auxiliary outputs 25 and multiple speaker outputs 26. The CD-ROM system component 23 is accessed through the faceplate input interface 21 by using the proper function selection controls 6. When an audio CD-ROM is placed in the CD-ROM system, the music output is sent from the CD-ROM 23 to the amplifier for signal boosting and eventual output to the speakers 26 or the auxiliary components 25. A physical RF and electromagnetic interference (EMI) partition 27 separates the various components within the mobile computer architecture. This is done to ensure system integrity and the partitions may take various forms and be comprised of various materials.

Referring again to FIG. 4, the computer system associated with this mobile architecture centers around the microprocessor 32, which performs all standard central processing unit (CPU) functions and is interfaced with other components through the address and data bus network 38. This network 38 is composed of a combination of address, control, and data busses and/or individual Input/Output (I/O) discrete lines. The Read Only Memory (ROM) 30 may contain coded instructions which may be fixed in medium by a variety of means such as, but not limited to, programmable ROM (PROM, EPROM, EEPROM) or any form of programmable logic device (PLD). The Application Specific Integrated Circuit (ASIC) 28 also may be designed for useful, specific mobile user applications. These two components together, or in separate modes, will provide the mobile user with an operating system by which the user can operate the computer apparatus. The operating system may have several levels of complexity and be proprietary in nature or of a commercial standard such as, but not limited to, a basic input output system (BIOS), disk operating system (DOS), Microsoft Windows 3.1, Windows 95, Windows CE, or QNX.

Again referring to FIG. 4, the Random Access Memory (RAM) module 29 may be composed of dynamic RAM (DRAM) or static RAM (SRAM). The Flash Memory 31 should be composed of a non-volatile memory component. Both the RAM 29 and the Flash 31 are designed to accommodate temporary and long term data storage needs and are designed for future expansion and/or upgrades. The microprocessor 32 also connects to the CD-ROM system component 23 so that data from a user supplied data CD-ROM can be read by the mobile computer architecture. The data may be continually accessed from the CD-ROM or loaded into system memory for later use and/or execution. The microprocessor 32 also connects to the amplifier 24 such that any desired microprocessor signal can be output to the speakers 26 or any auxiliary systems 25. A direct speaker interface 40 also is connected to the microprocessor 32. Additionally, auxiliary inputs 39 are interfaced to the microprocessor 32 and the faceplate input interface 21. These inputs allow for data input such as, but not limited to, external CD-ROM signals and vehicle diagnostic capabilities such as engine controller and environment control connections.

Referring again to FIG. 4, the microprocessor 32 can interface with expansion slots 33 and 34 which allow for additional integrated circuits or future upgrades. Additionally, the present invention has the microprocessor 32 connected to a display controller 41 which in turn connects to multiple user displays and multiple backlight and contrast controls 44. The display controller 41 is also interfaced with a buffer memory module 42. The mobile computer architecture microprocessor 32 is most importantly interfaced with an Input/Output (I/O) Processor 35 uniquely optimized for mobile user line replaceable unit (LRU) applications. The I/O processor 35 interfaces with internal LRUs 36 and external LRUs 37 as well as connecting to non-main assembly input components such as keyboards 16 and voice recognition commands 17. The I/O processor 35 and related bus structure is outlined in greater detail below.

Referring to FIG. 4 again, other necessary system components of the mobile architecture are depicted, such as power supplies and regulators 47, a battery backup 46, and oscillators 45. Power supplies could consist of various potential sources such as a 12V DC automobile battery 49 or automobile alternator source; voltage regulation could be stepped down to various levels including, but not limited to, 5V or 3.3V. A battery backup 46 could consist of an internally stored dry cell battery or a "keep alive" wire lead to an automobile battery. Oscillators 45 could take various forms including that of the temperature controlled crystal oscillator (TCXO). Finally, it is contemplated that the mobile computer architecture described herein may in fact have various forms, such as being a single chip or chipset, or being incorporated onto a larger chip or board as one of multiple functions on the chip or board.

Management System and Line Replaceable Units

It is usually desired in field operations to have a user friendly I/O management structure which allows the use of line replaceable units (LRUs). The LRU architecture described herein promotes flexibility and possesses easy reconfiguration capabilities while in a mobile vehicle environment. The preferred embodiment provides a data bus and I/O discrete line network (address, control, and data connections) which connect the I/O processor with an LRU. This network may contain a plurality of means such as, but not limited to, parallel and serial ports, ISA, EISA, PCI, and/or VME busses, PCMCIA card slots, or other types of standard busses or specially designed proprietary bus structures. Additional features of this optimized I/O management system are improved safety standards and theft deterrence.

Figure 5:
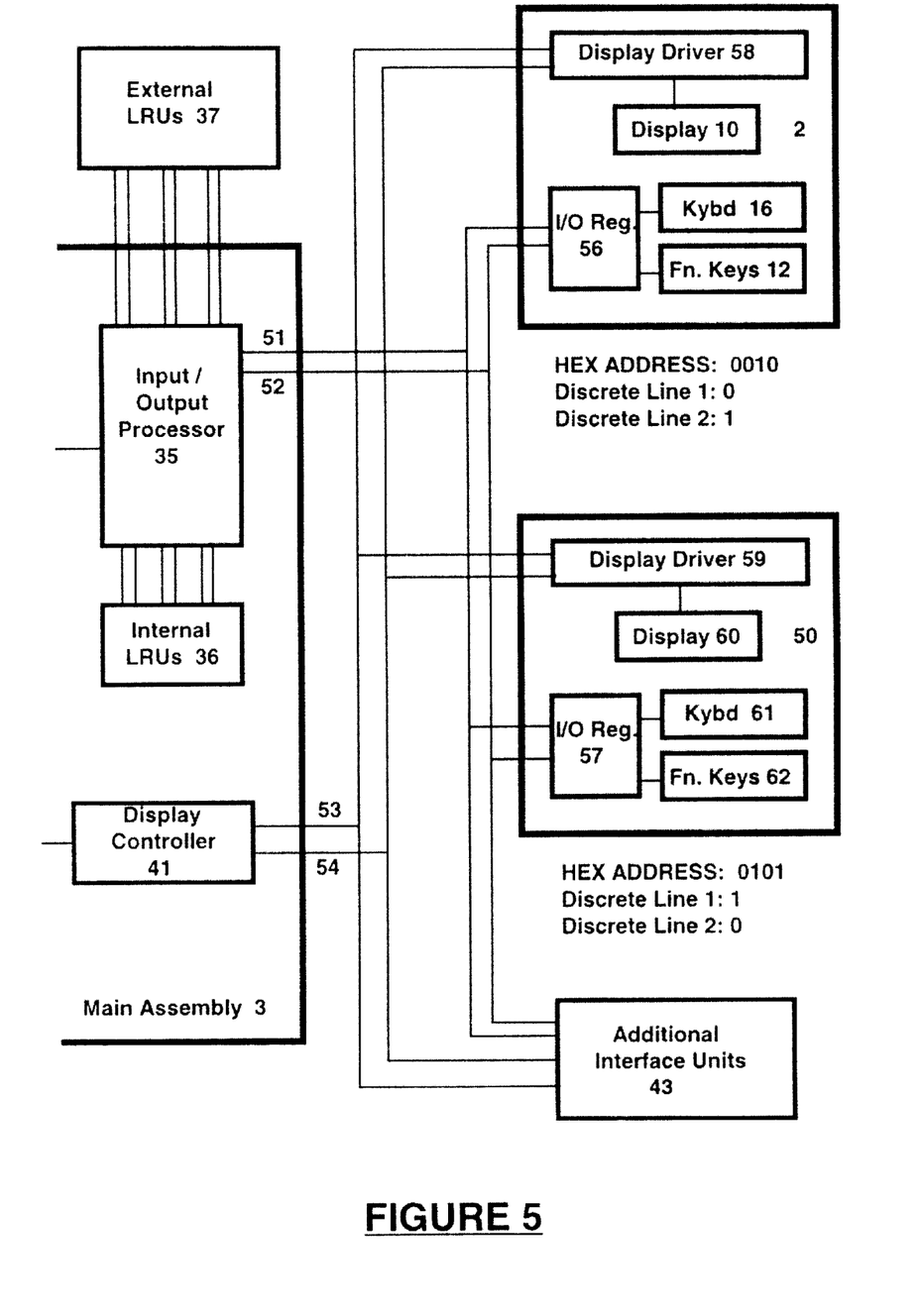
FIG. 5 is a block diagram illustrating the I/O management of the main assembly with the user interface units and with the line replacement units (LRUs)

Referring now to FIG. 5, a block diagram of the external I/O management system, the main assembly 3 is shown in partial representation with the I/O processor 35 and the display controller 41. The I/O data bus 51 is shown interfacing, among other components, the I/O processor 35 with internal LRUs 36 and external LRUs 37. The I/O data bus 51 is a combination of an address, control, and data bus structure consisting of, but not limited to, an eight (8), sixteen (16), thirty-two (32), or sixty-four (64) bit architecture. In possible conjunction with this bus structure is a complementing network of I/O discrete lines 52, which may cycle between, but is not necessarily limited to, ±5V or ±3.3V. The I/O data bus 51 and I/O discrete lines 52 also connect the I/O processor 35 with the first hand held user interface unit 2 as well as other hand held units 50 or additional user interfaces 43.

The display controller 41 also interfaces with the hand held units 2 and 50 as well as additional user interfaces 43 using the Display data bus 53 and the Display I/O discrete lines 54. The Display data bus 53 is a combination of an address, control, and data bus structure consisting of, but not limited to, an eight (8), sixteen (16), thirty-two (32), or sixty-four (64) bit architecture. In possible conjunction with this bus structure, the network is complemented with the Display discrete lines 54, which may cycle between, but not necessarily only, ±5V or ±3.3V. The Display data bus 53 and Display discrete lines 54 connect the Display controller 41 to the appropriate display drivers in the first 58 and second 59 hand held units. The display drivers 58 and 59 provide means, but are not limited to, generating characters, displaying layered text, and presenting graphics on the hand held unit displays 10 and 60. The I/O data bus 51 and I/O discrete line 52 connects the I/O processor 35 with the appropriate I/O registers in the first 56 and second 57 hand units. Hand held keyboard units 16 and 61, as well as hand held unit function keys 12 and 62, interface with the appropriate hand held unit I/O registers 56 and 57.

Again referring to FIG. 5, an example is shown to demonstrate the uniqueness of this LRU I/O management system. Appearing to the right of the depictions of hand held units 2 and 50, there appears a combination of addresses, represented as a HEX word and two discrete lines. In order to promote accurate data dissemination and collection, each hand held interface unit has a unique address from which to communicate with the mobile computer architecture. If the proper address signature is not provided to the mobile computer system in the main assembly 3, data access can be restricted. This can be done via user selected passwords or by hardware unit code and pin configuration. This feature promotes safety and data security for the system as well as providing substantial theft deterrence since the entire system can only be accessed by authorized users. This I/O management network also allows for quick field replacement of secured and authorized LRUs. In final consideration, it is also contemplated that the I/O management system described herein may in fact have various forms and embodiments, such as being a single chip or chipset, or being incorporated onto a larger chip or board as one of multiple functions on the chip or board.

Additional Anti-theft and Appearance Features

An alternative embodiment of the main assembly faceplate 5 involves an easily replaced front panel which can slide into place over the front of the main assembly 3. The replaceable faceplate would be standardized and the composition material flexible enough such that the faceplate could be physically touched to depress and activate an underlying function selection control. This feature provides for additional anti-theft deterrence and possible upgrade of the present invention's 1 appearance. To deter the system from being stolen, a blank boilerplate panel could be placed over the system to make it appear to outside onlookers that no mobile computer architecture exists in the vehicle. Custom designed replaceable faceplates could provide options on visually appealing user interface designs.

Figure 6A:
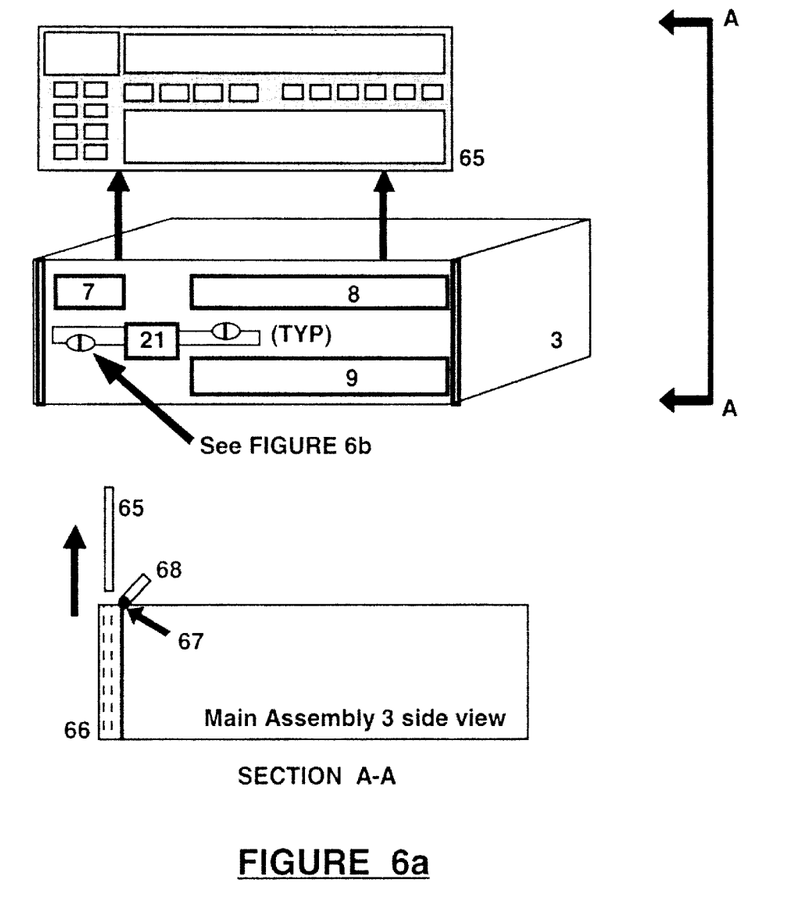
FIG. 6 illustrates additional anti-theft and safety features of a faceplate design alternative of the apparatus' main assembly.
Figure 6B:
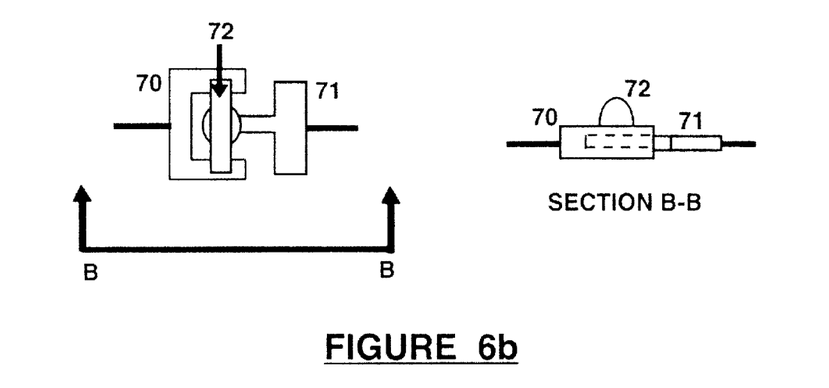

Referring now to FIG. 6a, an illustration of additional faceplate anti-theft and design features, an exploded view of the main assembly 3 is depicted with the replaceable faceplate 65 located above the front of the assembly. The replaceable faceplate 65 would fit down into the front panel retainer 66. At the top of the retainer is attached a hinge 67 which is also attached to the front panel retainer cover 68. The front panel retainer cover is closed down over the replaceable faceplate 65, once it has been slid into the front panel retainer 66. FIG. 6b shows a possible configuration for the function selection control 6 components. Switch component A 70 is situated next to and almost interlocks with switch component B 71. Switch component C 72 is crafted such that upon being depressed, it makes contact with both switch components A 70 and B 71. This allows an electric current to flow through the switch, thus activating the control. The replaceable faceplate 65 is pliant enough so that when it is secured in the front panel retainer 66, finger pressure upon its surface is sufficient to depress the underlying switch component C 72. It is also contemplated that these additional features may in fact have various forms, such as being on a single chip or chipset, or being incorporated onto a larger chip or board as one of multiple functions on the chip or board.

Independent Radio Navigation LRU I/O Device

Figure 7:
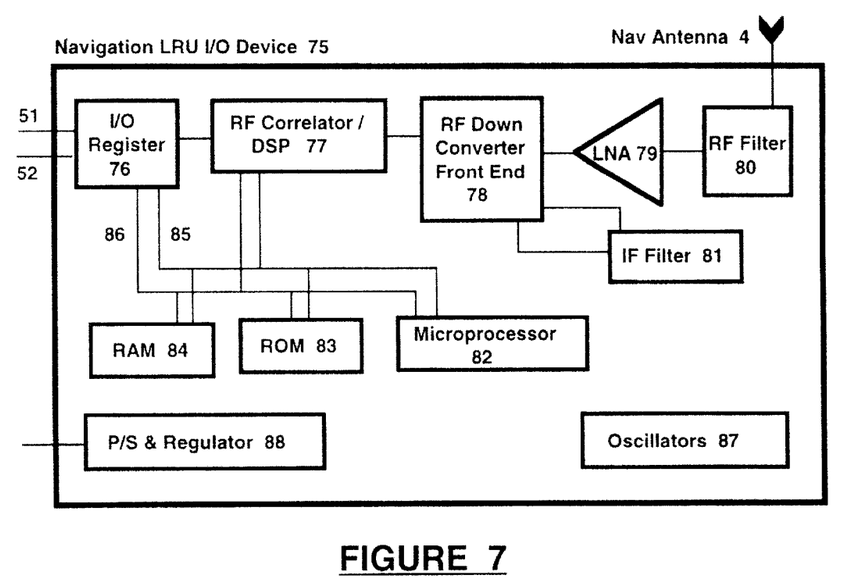
FIG. 7 is a block diagram illustrating a navigation LRU I/O device.

The preferred embodiment allows for the flexibility to add and configure the line replaceable units as required for the mobile user's needs. An additional feature of the present invention is a radio navigation LRU I/O device specifically designed to fully utilize the optimized I/O management of the mobile computer architecture. FIG. 7 illustrates a preferred embodiment for this LRU.

Satellite radio navigation signals can be used to compute a receiver's position anywhere on the Earth. Examples of such satellite radio navigation systems are the United States' Global Positioning System (GPS) and the Russian GLONASS navigation system. The determination of location based on radio navigation signals is well known in the art, therefore only a brief overview is outlined herein. The Cartesian (x,y,z) coordinates of the satellites are determined by interpreting the ephemeris data provided by the satellites. Pseudoranges between the receiver and the satellites are than calculated based on transmission time delays. Given information from four satellites, the location of the receiver can be determined from the four distance equations:

$$(X_1-U_x)^2+(Y_1-U_y)^2+(Z_1-U_z)^2=(R_1-C_b)^2$$

$$(X_2-U_x)^2+(Y_2-U_y)^2+(Z_2-U_z)^2=(R_2-C_b)^2$$

$$(X_3-U_x)^2+(Y_3-U_y)^2+(Z_3-U_z)^2=(R_3-C_b)^2$$

$$(X_4-U_x)^2+(Y_4-U_y)^2+(Z_4-U_z)^2=(R_4-C_b)^2$$

where $X_{1-4}$, $Y_{1-4}$, and $Z_{1-4}$, are the X, Y, and Z coordinates of the four satellites, $U_{x,y,z}$ is the position of the user's receiver, and $C_b$ is the clock bias error. There are four equations and four unknowns in this outlined system; therefore the equations can be solved for the clock bias and the position of the receiver. The preferred embodiment of the present invention couples this basic approach with statistical analysis techniques and the I/O management method outlined previously to produce a unique system which enhances the user's calculated location.

Referring now to FIG. 7, an illustration of an independent radio navigation LRU I/O device, it can be seen that the whole line replaceable unit is defined as component 75. A data bus 51, defined previously in FIG. 4, provides data to and from the I/O processor 35 and the navigation I/O register 76. Additionally, discrete lines 52, also defined previously in FIG. 4, relay discrete information between the I/O processor 35 and the navigation I/O register 76. The navigation I/O register 76 can forward data to the Radio Frequency (RF) Correlator/Digital Signal Processor (DSP) 77 and/or the navigation microprocessor 82. This information transfer occurs over the navigation data bus 86 and is coordinated through the use of a navigation address bus 85.

The preferred embodiment of the navigation LRU 75 is to receive radio navigation signals and then determine the receiver's position. This is done by receiving signals through the navigation antenna 4 and directing these signals to a radio frequency (RF) filter 80. The filtered signal is then passed to a low noise amplifier (LNA) 79 to boost signal strength and then forwarded to the RF front end down converter 78. Subsequent image filtering occurs in the IF filter(s) 81 to protect against out-of-band interfering signals. The signal is then passed from the RF down converter 78 to the RF correlator/DSP 77 for digital signal processing. This process includes, but is not limited to, acquisition and tracking of multiple channels of spread spectrum signals. Automatic Gain Control (AGC) functions may also be relayed between the RF DSP 77 and the RF down converter 78.

The navigation microprocessor 82 performs standard central processing unit (CPU) functions and is interfaced to memory through the navigation address bus 85 and data bus 86. The Random Access Memory (RAM) modules 84 may be composed of dynamic RAM (DRAM) or static RAM (SRAM). The Read Only Memory (ROM) 83 may contain coded instructions which may be fixed in medium by a variety of means such as, but not limited to, programmable ROMs (PROM, EPROM, EEPROM), application specific integrated circuits (ASICs), or programmable logic devices (PLDs). Also found within the navigation LRU 75 are other necessary system components such as power supplies and regulators 88 and oscillators 87. Power supplies could consist of various potential sources such as 12V DC and voltage regulation could be stepped down to various levels including, but not limited to, 5V or 3.3V. Oscillators could take various froms including one of the most popular, the temperature controlled crystal oscillator (TCXO).

Figure 8:
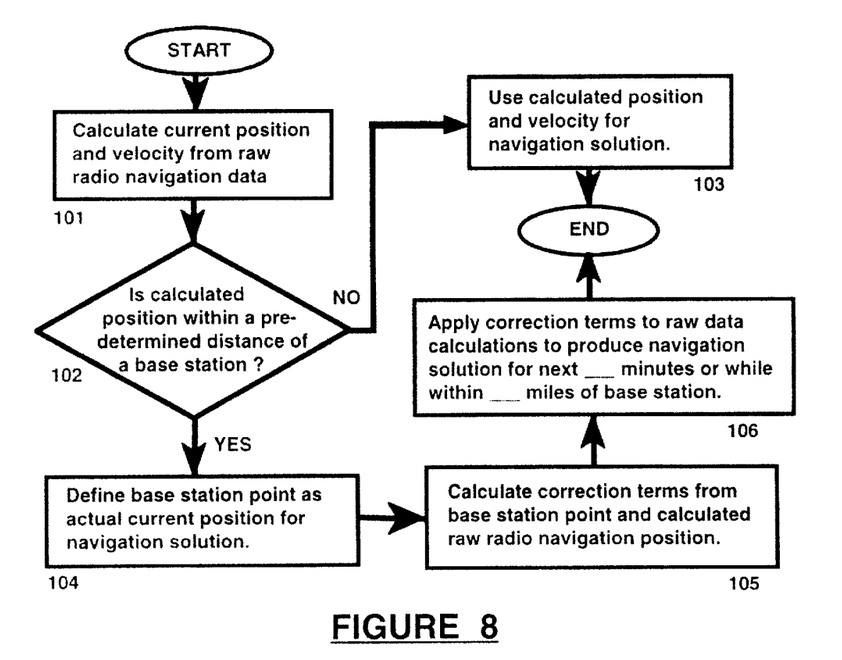
FIG. 8 is a flow chart of steps used for determining error correction terms for a navigation location solution.
Figure 9:
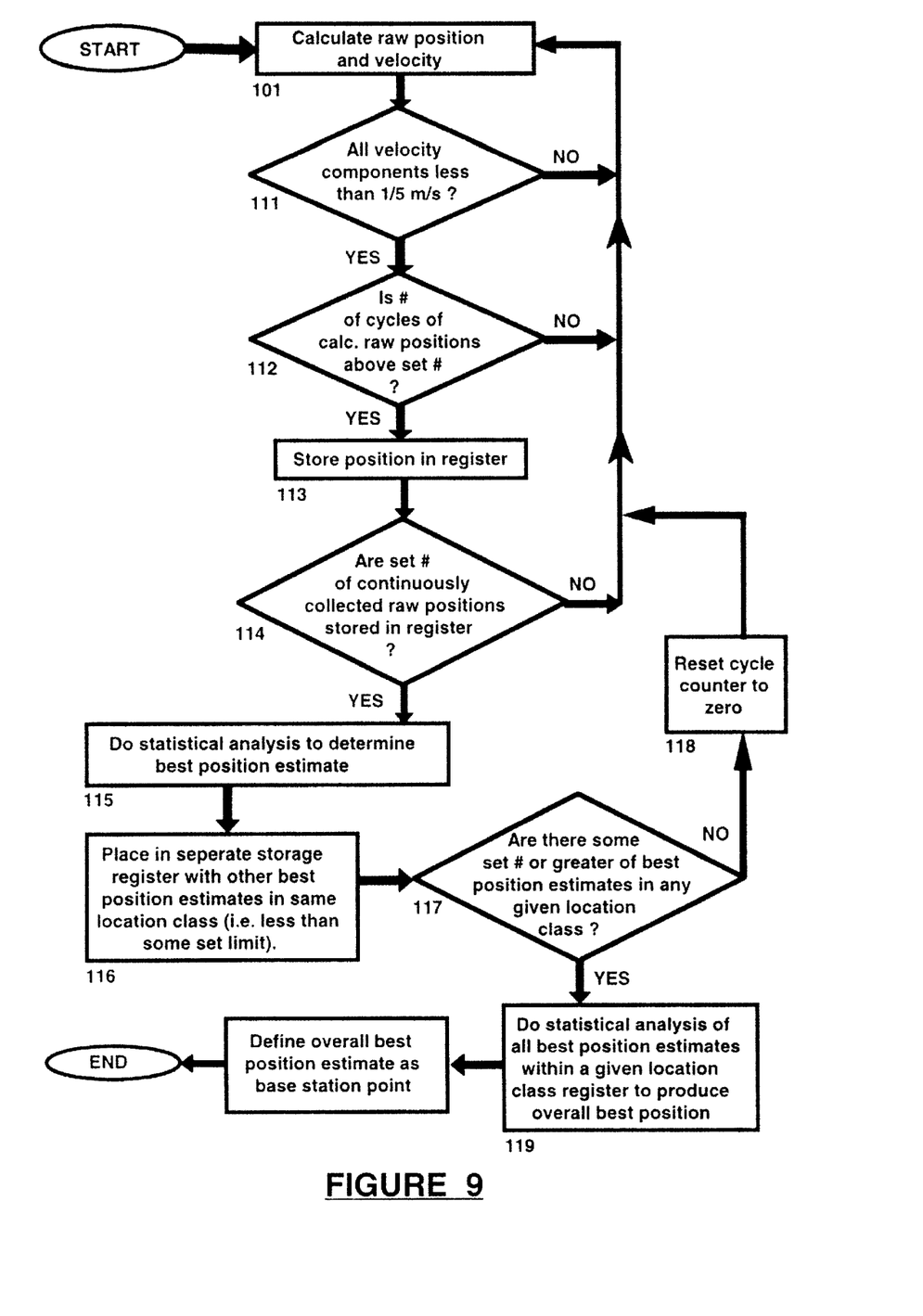
FIG. 9 is a flow chart of steps used for determination of base station points.

Encoded in the ROM 83 of the preferred embodiment navigation LRU I/O device 75, will be various methods to statistically optimize the position calculated from the radio navigation signals. Numerous means can be used to filter out signal noise and potential error sources. Examples include, but are not limited to, batch filters and recursive sequential filters of which Kalman filtering is one technique. A method to reduce positional uncertainty involves the incorporation of correction terms to counter possible error sources such as selective availability or atmospheric propagation delays. If a known survey location is compared to a receiver's collocated calculated position, correction terms can be determined to match the true known location with the calculated position. FIGS. 8 and 9 are flow chart representations of one of the methods employed in the ROM 83 of the present invention to reconcile a calculated position with that of a consistently used, "virtually known" base station point or position.

Referring now to FIG. 8, a flow chart for correction term data collection and determination, step 101 is first performed to calculate the position and velocity of the user receiver from raw radio navigation data. Step 102 determines if this raw calculated position is within a certain predetermined distance from a base station point stored in archival memory. An answer of no leads to step 103 which states there are no special correction terms to modify the raw data with and to use the position calculated from raw data as the navigation solution provided to the user.

An answer of yes to step 102 leads to step 104 which defines the base station point as the actual current position used in the user provided navigation solution for that particular cycle. Step 105 than calculates correction terms for immediate use of future navigation solutions. This is accomplished by using the base station point as the "truth" and calculating positional errors from the difference between the "true position" and the raw data position. Step 106 applies the correction terms to the user supplied navigation solution for a predetermined period of time or while the user receiver remains within a predefined geographical distance of the base station point location.

Referring now to FIG. 9, a flow chart for base station point determination, step 101 is called and the position and velocity of the user receiver is calculated from raw radio navigation data. Step 111 then determines if the user's velocity components are less then some predetermined value. This is a check to ensure that the vehicle is not moving. If the answer is no to this step, no further base station point determination is attempted. If the answer to step 111 is yes, step 112 then determines if the number of raw radio position calculations, taken while the vehicle is not in motion, exceeds some predetermined value. This step ensures that base station points are not set for random vehicle stopping locations such as stop lights. If the answer to step 112 is negative, no further base station point determination is attempted.

If the answer to step 112 is affirmative, step 113 stores the calculated position in memory for future use. Step 114 is then executed, in which a check is done to ensure that a predetermined number of continuously collected raw position calculations have been stored in memory. This is done to ensure that there exists enough position data to perform acceptable statistical analysis. If step 114 is executed and enough data does not exist, then no further base station point determination is attempted. If enough data does exist in the stored memory register, then step 115 is executed. Step 115 performs the coded statistical analysis; an example of which could be, but not necessarily limited to, Gaussian least squares.

Upon completion of step 115, step 116 places the best position estimate into a separate storage register reserved exclusively for the best position estimates of the same location class, i.e. estimates that are within a predetermined distance from each other. Step 117 is then executed, which determines if there are more then some predetermined number of best position estimates within any given location class register. If the answer is negative, no further base station point determination is attempted. Step 118 is then executed to reset the continuous cycle counter to zero. This ensures that multiple best position estimates are not generated from any given vehicle stoppage.

If the answer to step 117 is affirmative, step 119 is then performed which performs an additional round of statistical analysis on all best position estimates within a given location class register. An example of a technique for this analysis could be, but is not necessarily limited to, Gaussian least squares. Step 119 will produce an overall an overall best position estimate which is then defined as a valid base station point in step 120. Execution of step 120 completes the routine for base station point determination.

FIGS. 7, 8, and 9 illustrate a unique embodiment of a radio navigation LRU I/O device. Alternative embodiments could have other features or configurations including, but not limited to, multiple same signal radio navigation reception, multiple signal radio navigation reception, and mixed navigation systems. It is also contemplated that the radio navigation LRU I/O device may in fact have various forms, such as being a single chip or chipset, or being incorporated onto a larger chip or board as one of multiple functions on the chip or board.

Crash Detection LRU I/O Device

An additional embodiment of the present invention is a crash detection LRU I/O device specifically designed to fully utilize the optimized I/O management of the mobile computer architecture. FIG. 10, an illustration of the crash detection LRU I/O device, contains two depictions; one displays a preferred embodiment for a board layout and the second depicts sensor orientation information. As discussed in the background of related art, this LRU I/O device does not use a vehicle's air bag system and is fully self-contained to interface with the present invention.

Figure 10A:
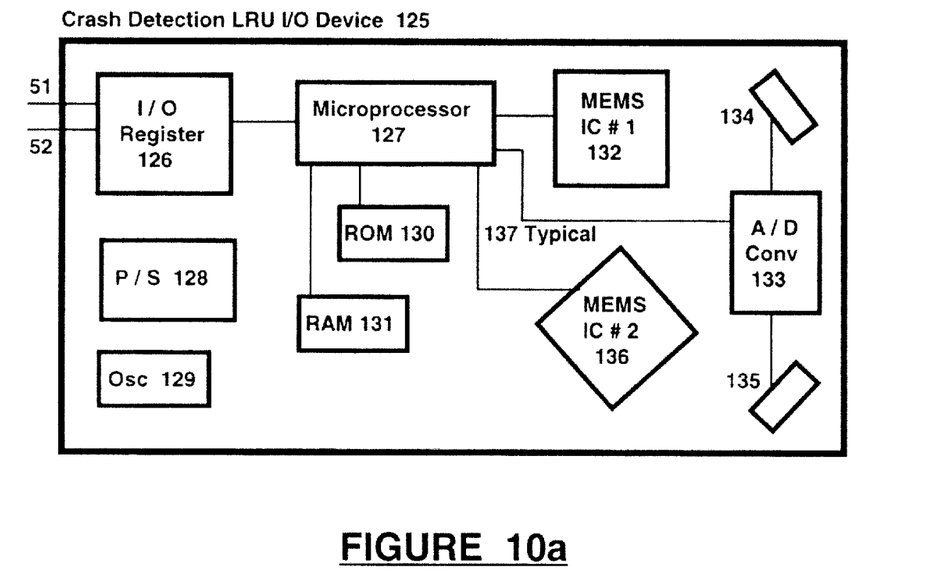
FIG. 10 is a block diagram illustrating a crash detection LRU I/O device card with accelerometer and/or strain gauge orientation.

Referring now to FIG. 10a, an illustration of an independent crash detection LRU I/O device, it can be seen that the whole line replaceable unit is defined as component 125. A data bus 51, defined previously in FIG. 4, provides data to and from the I/O processor 35 and the crash detection I/O register 126. Additionally, discrete lines 52, also defined previously in FIG. 4, relay discrete information between the I/O processor 35 and the crash detection I/O register 126. The crash detection I/O register 126 forwards information to the crash detection microprocessor 127. This information transfer is coordinated and passed over the crash detection data bus network 137.

The preferred embodiment of the crash detection LRU 125 will accurately determine if a vehicle accident, or crash, has occurred. The I/O device 125 accomplishes this task by sensing if a deceleration of the LRU unit is above some predetermined threshold value. Deceleration is calculated from information provided by accelerometers located on microelectro-mechanical sensors (MEMS) or from strain gauges. The present invention can employ both or either component and can also verify the direction and magnitude of the impacting force through the employment of at least two sensing units that are purposely skewed in relation to each other. The resulting crash detection data can than be forwarded onto emergency service providers to help the mobile user.

Referring again to FIG. 10a, the crash detection microprocessor 127 performs all the standard CPU functions. The crash detection microprocessor 127 is connected to the microelectro-mechanical sensor (MEMS) integrated circuits (ICs) 132 and 136 via the crash detection data bus network 137. Also connected to the network 137 is the Analog to Digital (A/D) converter 133, which in turn is connected to the first 134 and second 135 strain gauge instruments. The crash detection network 137 also allows the microprocessor 127 to interface with the crash memory modules. The Random Access Memory (RAM) module 131 may be composed of dynamic RAM (DRAM) or static RAM (SRAM). The Read Only Memory (ROM) 130 contains coded instructions which may be fixed in medium by a variety of means such as, but not limited to, programmable ROMs (PROM, EPROM, EEPROM), application specific integrated circuits (ASICs), or programmable logic devices (PLDs). Also found within the crash detection LRU 125 are other necessary system components such as power supplies and regulators 128 and oscillators 129. Power supplies could consist of various potential sources such as 12V DC and voltage regulation could be stepped down to various levels including, but not limited to, 5V or 3.3V. Oscillators could take various forms including, but not limited to, the temperature controlled crystal oscillator (TCXO).

Figure 10B:
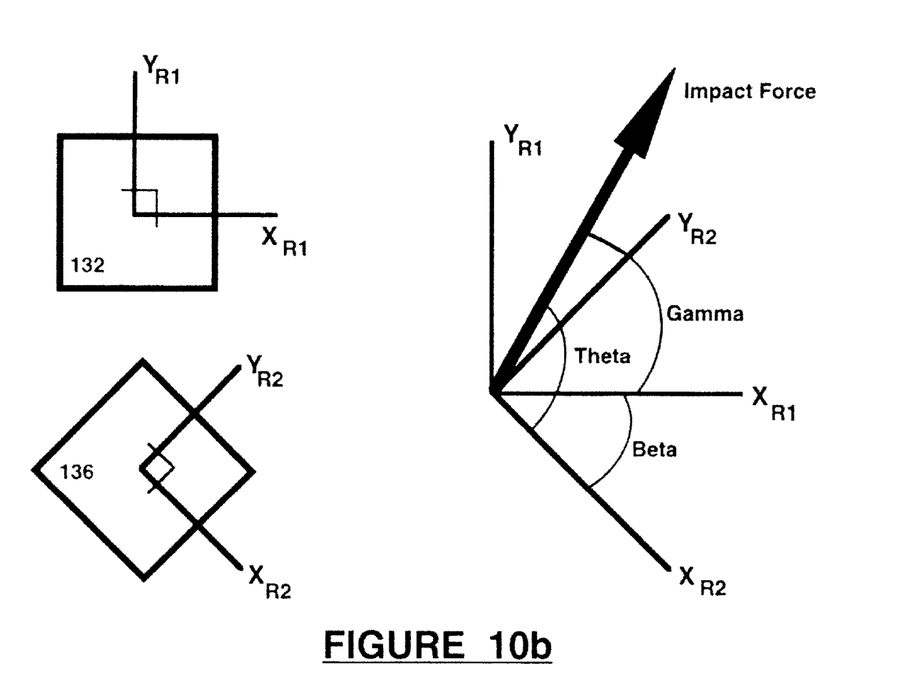

Referring now to FIG. 10b, it can be seen that either the two MEMS ICs 132 and 136, or the two strain gauges 134 and 135, or a combination of the two can be oriented such that there is some known skew angle, $\beta$, between the two components. Furthermore, the angle between the two units and the main assembly 3 can be set such that the orientation of an impacting force with respect to a vehicle's reference frame may be known. FIG. 10b denotes a reference frame for the first MEMS IC 132 as $X_{R1}$ and $Y_{R1}$ and a second reference frame for the second MEMS IC 136 as $X_{R2}$ and $Y_{R2}$. A sample impact force is depicted by an arrow; the angle between the impact vector and the first reference frame is defined as $\gamma$, and the angle between the impact vector and the second reference frame is defined as $\phi$. It is therefore possible to resolve the impact force vector into components in each reference frame as follows:

$X_{R1}$=(Impact Magnitude) cos $\gamma$ $Y_{R1}$=(Impact Magnitude) sin $\gamma$ $X_{R2}$=(Impact Magnitude) cos $\phi$ $Y_{R2}$=(Impact Magnitude) sin $\phi$ Since the relationship between the angle $\gamma$ and the angle $\phi$ is known in terms of angle $\beta$, it is possible to compare the impact force components sensed in one reference frame with that which was sensed in the second reference frame. This allows for redundant sensing abilities and a capability for sensor fault detection and identification. This in turn provides a safer and more robust system for the mobile user.

FIG. 10 illustrates a unique embodiment of a crash detection LRU I/O device. Other alternative embodiments could possess features or configurations including, but not limited to, three dimensional accelerometers and strain gauge set-ups and mixed crash detection systems. It is also contemplated that the crash detection LRU I/O device may in fact have various forms, such as being on a single chip or chipset, or being incorporated onto a larger chip or board as one of multiple functions on the chip or board.

What is being claimed in the present invention is:

1. An apparatus for computation and input/output management in a mobile environment comprising:

a computer system with processing means, I/O processing means, input means, and output means, wherein the computer system performs operations responsive to data from the input means and outputs data to the output means;

one or more line replacement units, wherein each of the line replacement units performs a dedicated function in the mobile environment in cooperation with the processing means of the computer system;

data bus means coupled to the I/O processing means of the computer system and said one or more line replacement units for transferring a combination of address, control, and data information;

discrete line means coupled to the I/O processing means of the computer system and said one or more line replacement units for transferring discrete information; and the I/O processing means is required to recognize a unique address in order to communicate with the one or more line replacement units, wherein said I/O processing means uses the data bus means in conjunction with the discrete line means to address said one or more line replacement units.

2. The apparatus for computation and input/output management of claim 1, wherein the apparatus is coupled to an AM/FM radio.

3. The apparatus for computation and input/output management of claim 1, the apparatus further providing means for user applications wherein the applications are audio, visual or multi-media.

4. The apparatus for computation and input/output management of claim 1, wherein the apparatus interfaces with one or more data input or output devices.

5. The apparatus for computation and input/output management of claim 1, wherein data can be entered into or outputted from said computer system by vocal means.

6. The apparatus for computation and input/output management of claim 1, the apparatus further providing input and output of navigation information wherein the navigation information may include route guidance.

7. The apparatus for computation and input/output management of claim 1, wherein the apparatus interfaces with a vehicle's internal components to access data associated with one or more of the following: vehicle operational status, diagnostic capabilities, theft deterrent devices, collision detection systems, vehicle lock mechanisms, or any other vehicle safety, maintenance, or caution and warning systems.

8. The apparatus for computation and input/output management of claim 1, wherein the apparatus interfaces with wireless communication means for the reception of data.

9. The apparatus for computation and input/output management of claim 1, wherein the apparatus interfaces with wireless communication means for the purposes of two way communication of data to a mobile user.

10. The apparatus for computation and input/output management of claim 1, wherein the apparatus is contained within one enclosure for ease of use or installation.

11. The apparatus for computation and input/output management of claim 10, wherein the display is deployable from the enclosure and contains means for entering data into the computer system.

12. The apparatus for computation and input/output management of claim 1, wherein a faceplate is removable and interchangeable with similarly designed faceplates.

13. The apparatus for computation and input/output management of claim 1, wherein the apparatus is a self-contained hand-held unit.

14. A method for computation and input/output management of a computer system in a mobile environment, wherein said computer system has processing means, I/O processing means, input means, output means, data bus means, and discrete line means, comprising the steps of:

performing operations responsive to data from the input means and outputting data to the output means;

communicating with one or more line replacement units, wherein each of the line replacement units performs a dedicated function in the mobile environment in cooperation with the processing means of the computer system;

transferring a combination of address, control, and data information between the one or more line replacement units and the I/O processing means of the computer system via the data bus means;

transferring discrete information between the one or more line replacement units and the I/O processing means of the computer system via the discrete line means;

requiring the I/O processing means to recognize a unique address in order to communicate with the one or more line replacement units; and using the data bus means in conjunction with the discrete line means by the I/O processing means to address the one or more line replacement units.

15. A computer readable medium for storing computer executable instructions for computation and input/output management of a computer system in a mobile environment, wherein said computer system has processing means, I/O processing means, input means, output means, data bus means, and discrete line means, and the computer executable instructions comprise the steps of:

performing operations responsive to data from the input means and outputting data to the output means;

communicating with one or more line replacement units, wherein each of the line replacement units performs a dedicated function in the mobile environment in cooperation with the processing means of the computer system;

transferring a combination of address, control, and data information between the one or more line replacement units and the I/O processing means of the computer system via the data bus means;

transferring discrete information between the one or more line replacement units and the I/O processing means of the computer system via the discrete line means;

requiring the I/O processing means to recognize a unique address in order to communicate with the one or more line replacement units; and using the data bus means in conjunction with the discrete line means by the I/O processing means to address the one or more line replacement units.

* * * * *